United States Patent [19]

Cox et al.

[11] 3,764,915

[45] Oct. 9, 1973

[54] DYNAMIC PROGRAM CONTROL FOR CHANNEL ASSIGNMENT IN MOBILE COMMUNICATION SYSTEMS

[75] Inventors: Donald Clyde Cox, New Shrewsbury; Douglas Otto John Reudink, Colts Neck, both of N.J.

[73] Assignee: Bell Telephone Laboratories Incorporated, Murray Hill, N.J.

[22] Filed: June 25, 1971

[21] Appl. No.: 156,791

[52] U.S. Cl. .................... 325/53, 179/41 A, 325/55

[51] Int. Cl. .................... H04q 7/00

[58] Field of Search .................... 325/51, 53, 55; 340/146.1 C, 47; 179/41 A

[56] References Cited

UNITED STATES PATENTS

| | | | |
|---|---|---|---|
| 2,896,072 | 7/1959 | Bachelet et al. | 325/53 |
| 3,351,714 | 11/1967 | Kunzelman et al. | 179/41 A |
| 3,539,924 | 11/1970 | Daskalaskis et al. | 325/51 |
| 3,555,424 | 1/1971 | Malm | 325/53 |
| 3,582,787 | 6/1971 | Muller et al. | 325/53 |
| 3,626,112 | 12/1971 | Henquet | 179/41 A |
| 3,662,267 | 5/1972 | Reed | 325/51 |
| 3,663,762 | 5/1972 | Joel | 325/51 |

OTHER PUBLICATIONS

Staras and Schiff, A Dynamic Space Division Multiplex Mobile Radio System, IEEE Transactions on Vehicular Technology, May 1970, pp. 206–213.

*Primary Examiner*—Charles E. Atkinson
*Attorney*—W. L. Keefauver

[57] ABSTRACT

To determine a channel which may be advantageously assigned to a mobile user via a preferred one of a plurality of spacially remote base stations, a central control computer considers the status of use of all communication channels utilized by the system. All of these channels constitute but a single set, so any of them may be assigned to a mobile user by way of any base station. Thus, the allocation procedures utilized by the computer feature optimization tests which insure minimal station-to-station interference with optimal "packing" and re-use of the channels over the entire system.

7 Claims, 8 Drawing Figures

INVENTORS D. C. COX
D. O. J. REUDINK
BY Roy M. Porter Jr.
ATTORNEY

DYNAMIC PROGRAM CONTROL FOR CHANNEL ASSIGNMENT IN MOBILE COMMUNICATION SYSTEMS

BACKGROUND OF THE INVENTION

This invention relates to mobile communications systems. More particularly, it relates to those mobile systems which feature a central control unit for channel assignment by way of remote base stations.

Generally, two classes of centrally controlled mobile communication systems may be distinguished. In the first of these, apparatus which is loosely designated a control unit merely serves the purpose of making unused channels available to mobile users. For example, some systems in this class mark all unused channels with a flag marker, leaving to the mobile user the actual choice of channel. These systems rely chiefly upon randomness of signaling from geographically disparate mobile users to provide a somewhat uniform allocation of the channels. Clearly, systems of this type, although denominated centrally controlled, actually provide no genuine control functions at all.

In a second class of mobile communications systems, of which systems embodying the present invention are members, a central control unit actively assigns channels to the mobile user, thereby providing a genuine control function. While these systems are generally more complex than the aforementioned systems without genuine central control, they usually feature substantial improvements in operating performance. The prior art systems in this class have, nevertheless, demonstrated a certain amount of inflexibility which is detrimental to overall system performance. In particular, the nature of this inflexibility may be directly traced to the type of central control afforded. For example, to facilitate channel allocation, these systems almost always restrict the number of frequency channels which may be allocated via any particular remote base station. Thus, if a large demand occurs in the area served by a particular remote base station, these systems will be forced to give large numbers of service refusals. Also, this restriction imposes severe constraints upon system performance when users cross from the area served by one base station (and its set of available channels) to those served by another base station (with a different set of available channels). Moreover, the restricted nature of channel assignments to particular base stations severely limits system flexibility with respect to use of channels over the whole system, and also with respect to demand variations which occur as a function of location and of time.

To appreciate why these prior art mobile communications systems have encountered such difficulty with respect to channel allocation effectiveness, it is instructive to consider some of the individual approaches which have been utilized. At the simplest and most obvious extreme of the complexity spectrum, certain system designs feature one or more operators who must allocate channels upon demand. Obviously, operator controlled systems are very inefficient, since only the quickest and most rudimentary of "tests" may be performed without crippling the system all together. Accordingly, operator controlled systems are severely deficient from the standpoint of allocation optimization. On the other end of the complexity spectrum are the hard-wired systems, such as the one presently used on the New York to Washington high-speed train. These systems are built with fixed channel to base station allocations, but feature switching apparatus which substantially decreases termination of calls due to transition between zones served by base stations with different channel sets. The hard-wired feature of these systems, however, accounts for a notable lack of flexibility; they provide no facility for adapting to changing user demands. Thus, in any zone, only a small portion of the channels used by the system are ever available at a given time.

SUMMARY OF THE INVENTION

Rather than being restricted to rigidly structured or quasi-random schemes for channel allocation, systems embodying the present invention allocate communication channels to mobile users in accordance with fixed but very flexible allocation procedures. Accordingly, they provide a degree of overall system performance unavailable from the prior art.

The present invention is a method and algorithm embodied as a control program operating in a central control unit of a mobile communication system, which dynamically allocates communication channels. When requests for channels by mobile users are related to the central control, the central program monitors the status of all channels at every base station and then determines which channel, if any, may be allocated to the requesting user. The determination of the channel which should be allocated is made in accordance with certain channel re-use and allocation optimization criteria, thereby insuring that it is the preferred allocation from the standpoint of desired system performance.

As embodied in a control program operating in a central control unit, the algorithm (and method) which comprises the present invention begins with the identity of a preferred base station from which the channel will be allocated to the mobile user. This station may be designated as "preferable" due to its close spacial proximity to the user, relative velocity of the user, or similar considerations. The program then provides for a search over the entire set of channels utilized by the system, one at a time, performing several tests upon each. First, in order of increasing distance from the preferred base station, each base station in the system is monitored for use of the channel under consideration. If that channel is in use nowhere, the assignment is made immediately; otherwise, the base stations which are nearest to the preferred base station and using the channel under consideration are marked for further testing. Each base station so marked is then tested in accordance with re-use criteria to prevent base station-to-mobile and mobile-to-base station cochannel interference. If a base station satisfies the re-use criteria, it is subjected to an optimization test; otherwise, it is discarded. In particular, the optimization test may be chosen in accordance with anticipated system demand distribution; several optimization criteria are suggested hereinafter. In any case, the optimization testing is provided to prevent "wasting" of channels by uneconomically assigning them throughout the system. Only after all channels have been considered in this manner is the one which best satisfies the re-use and optimization criteria assigned to the user. Of course, if no suitable channels are available, the mobile user is refused service until a later time.

It is a primary feature of the present invention that all communication channels utilized by the system are available for consideration for assignment to any mobile user via any remote base station at virtually any time. Moreover, this accessibility is highlighted by the feature that the channels so available are allocated with a minimum of wastage over the system. Accordingly, base station-to-base station interference is minimized, while channel re-use over the entire system is maximized. The aggregate of these features results in operating performance which substantially improves upon that demonstrated by the prior art.

DETAILED DESCRIPTION

Prior to a particular discussion of the system to which the principles of the present invention may be applied, it is instructive to consider in some detail certain prior art systems. That is, since a suggested system for advantageously applying the principles of the present invention shall include variations of the well known MJ or MK radio systems, it is beneficial that the general principles of these systems be discussed. (MJ and MK systems are generally similar, with their basic difference being channel capacity and frequency band utilized thereby.)

The two primary pieces of apparatus of the MJ and MK systems include the transmitter, receiver, and control unit which comprise a mobile set, and the transmitter, receiver, and control unit which comprise a base station and are in turn connected to the telephone central office. Generally, communication circuits are established between the mobile set and the base station transmitter by a radio frequency channel. The operation is fully duplex.

MJ and MK systems are designed to operate with a fixed number of transmission channels. Thus, when a particular channel is in use, the base station transmitter and receiver unit shifts to a new channel to serve other mobile users. A basic feature of operation of the MK system is the automatic marking and selection of a radio channel for each call. Whenever there are channels idle and available for traffic, the control terminal selects one channel and puts the base transmitter carrier corresponding to that channel on the air modulated by an idle marking tone. All idle mobile sets automatically hunt over the set of channels until they detect the idle tone, and then lock themselves on this marked channel. The next call in either direction is therefore established over the marked channel, with the involved user's mobile unit remaining locked thereon. In the process of completing the call, the base station also moves the idle tone to some other available channel, thereby causing all idle mobile sets other than the involved user's set to hunt again for the channel marked with the idle tone.

In the following discussion, the operation of any MJ or MK apparatus shall be assumed to be standard unless variations are particularly described. Comprehensive functional and structural descriptions of the MK systems may be found in two Motorola, Inc., Instruction Manuals entitled "Motorola FM Two-Way Radio Base Station," and "Motorola Car Telephone FM Two-Way Radio MK Mobile Radio Telephone System," published by Motorola Engineering Publications, 1969, Chicago, Ill. A simple but instructive description of the MJ mobile radio system (which differs from MK only in matters unimportant to this discussion) may be found in the *Bell Laboratories Record*, Volume 42, No. 11, page 382, in an article entitled, "The MJ Mobile Radio Telephone System."

Figure 1A:
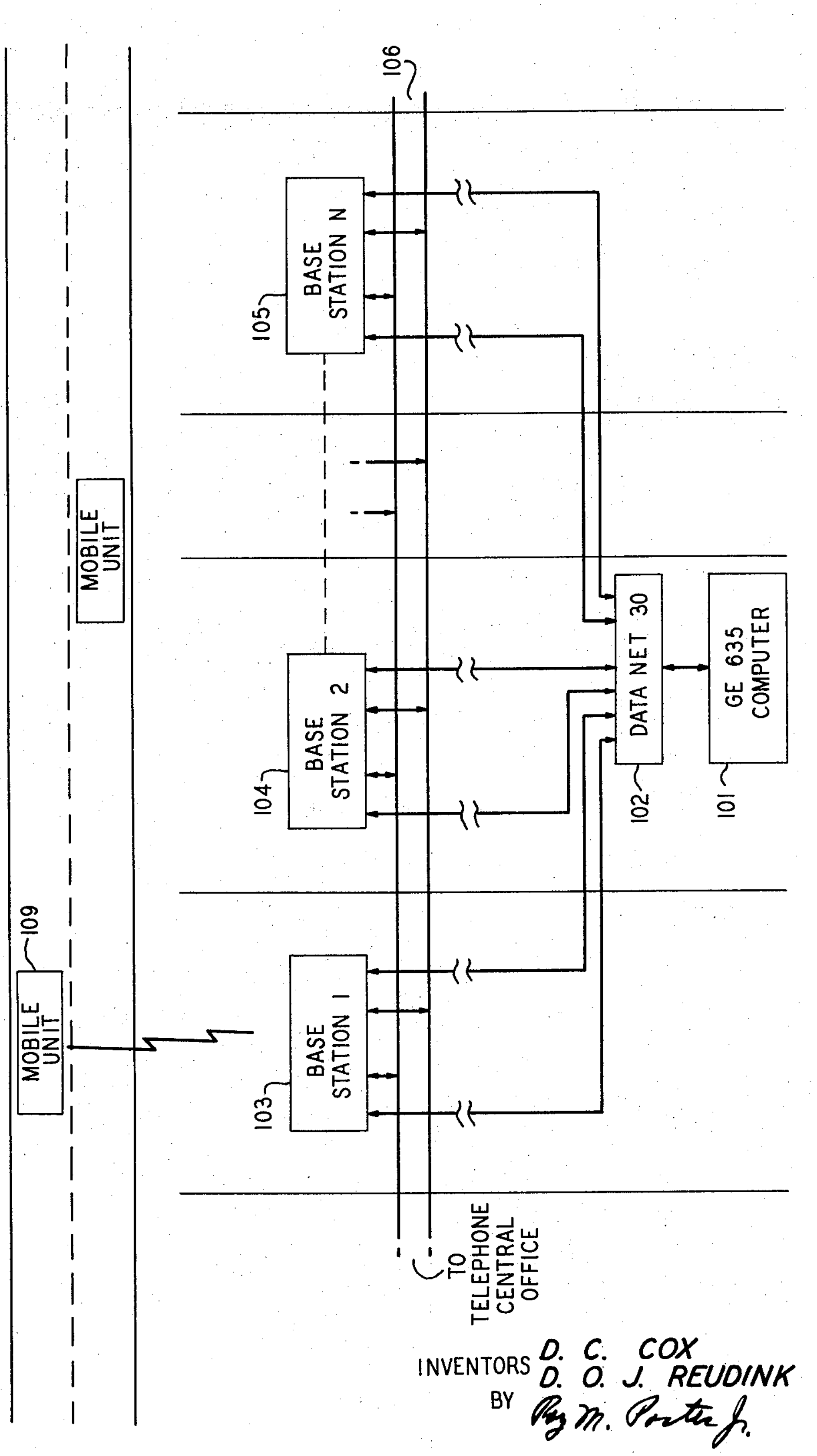
FIGS. 1A and 1B show portions of a mobile communication system which may advantageously utilize the principles of the present invention.

FIG. 1A shows a diagram of a particular mobile radio system which may advantageously utilize the principles of the present invention. At the heart of the system is a General Electric 635 Computer 101 which controls the overall system function. More particularly, the computer 101 is programmed to perform at least two specific functions. First, the computer program which embodies the principles of the present invention, and which shall be described in considerable detail hereinafter, is programmed into computer 101. In addition, a portion of the memory of the computer 101 should be allocated to a data set which corresponds to the status of use of each channel employed by the system of FIG. 1A at each of the base stations. This data set enables the operation of the channel allocation program without repetitive checks on each of the base stations.

Interfacing computer 101 with the remainder of the system of FIG. 1A is a Datanet 30 interface unit 102. It is the function of the Datanet 102 to draw information from all peripheral apparatus of the system and convert it to signals which may be processed by the General Electric 635 Computer 101. Similarly, the Datanet 30 processes information from the computer 101 prior to its transmission to the peripheral apparatus. The Datanet 30 is described in great detail in two General Electric manuals entitled "Datanet 30 Systems Manual," and "Datanet 30 Programming Reference Manual," both published by the General Electric Computer Department in 1965 at Phoenix, Ariz. For the system of FIG. 1A, the operation of the Datanet 30 is not altered at all.

A plurality of base stations 103, 104, 105, etc., designated base stations 1 through N, are the remote terminals for the system shown in FIG. 1A. Each of these base stations serves a particular remote area, so that each may serve all mobile users within that area. Lines 106 (depicted as a pair, but in actuality a large number of pairs, one for each subscriber) connect all base stations to a telephone central office. Each base station is, in turn, connected through a transmission link to the Datanet 30,102 operating at the central control of the system. Thus, whether a mobile call is initiated from a mobile unit 109 or from the telephone central office, the audio connections are made between lines 106, a base station such as station 104, and the mobile unit, such as unit 109. The associated control functions for allocating channels and determining which base station shall perform the connection is done by the central computer 101 by way of the Datanet 30,102.

Figure 1B:
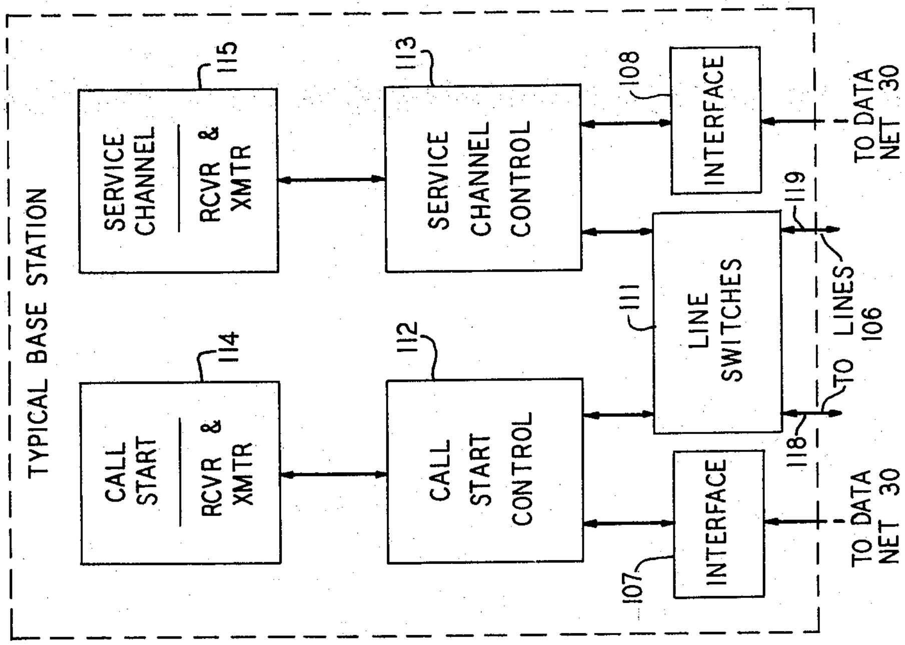

FIG. 1B shows the makeup of the base stations which are shown as boxes in FIG. 1A (i.e., 103, 104, and 105). The connections between the base station and the lines 106 to the telephone central office, numbered 118 and 119 in FIG. 1B, are maintained by the line switches 111. These switches 111 may be embodied as simply as a group of relays, and their only function is to transfer connections to the central office via the line pair 106 between call control units 112 and 113. The call control units 112 and 113 are, in turn, connected to a pair of combination transmitter and receiver units 114 and 115. A pair of interface modules 107 and 108 sense data from the control units 112 and 113, encode the data, and transmit it to the Datanet 30,102. Similarly, they also sense and decode messages from the Datanet 30,102 and enable corresponding operations in the control units 112 and 113.

In the discussion of standard MJ and MK mobile systems presented hereinbefore, it was noted that a standard base station includes control apparatus and transmission and receiving apparatus. In FIG. 1B, the typical base station includes two such MK (or MJ) base stations. That is, control unit 112 is actually embodied as the control aspect of a standard base station, and receiver and transmitter apparatus 114 is embodied as the receiver and transmitter apparatus of the same base station. Similarly, units 113 and 115 make up a standard base station. In conventional systems, however, a separate set of channels is utilized by each standard base station, all channels being used as communication channels. In contrast, the entire system of FIG. 1A is designed to operate with the set of channels normally utilized by an individual standard base station. In the system of FIG. 1A, one of these channels is designated a "call-start channel" and is used exclusively throughout the system to establish the initial connection with a mobile unit for the call setup procedure. The remainder of the channels are used as communication channels.

Accordingly, each typical base station of FIG. 1A utilizes a standard base station to establish initial connections, i.e., a call-start base station including call-start control 112 and call start receiver and transmitter 114 to monitor the call-start channel. Similarly, each typical base station of FIG. 1A includes a second standard base station which provides and maintains the service channels, and which includes a service channel control 113 and a service channel receiver and transmitter 115. Thus, once the call-start station has set up a call, the connection is transferred to the service station for maintenance on a service channel.

Since the MK or MJ apparatus utilized in each typical base station is unchanged but for the altered channel maintenance procedure and functions, the interface units are necessary to monitor the status of each control unit (call-start control 112 and service channel control 113) and of the link with the Datanet 30,102, and to transmit and receive information between the typical base station and the Datanet 30,102 which is located at central control. This transmittal of information is necessary so that the computer 101 may up-date its channel status data set and thereby continuously maintain an accurate picture of channel use at all points in the system. The interface units, therefore, may be embodied by means of a large variety of standard apparatus capable of three functions: first, sensing or controlling switch closures which exist in the MJ or MK control terminals 112 and 113 located in the base station; second, coding or decoding that status into and from a digital message; and third, transmitting or receiving the coded message to or from the Datanet 30,102. The Datanet 30 in turn decodes the characters transmitted from the interface unit and conveys it to the computer 101, as well as encoding messages from the computer 101 and transmitting them to the interface units.

More particularly, the interface units such as units 107 and 108 may be embodied by a standard teletypewriter coder and decoder which monitors switches located in the MJ or MK control terminal in the same manner as a standard teletypewriter coder-decoder monitors the switch closures of a keyboard. Thus, operation of designated switches in the call control units 112 and 113 (corresponding to definite operations therein) activate specific code producing apparatus in the teletypewriter coder, and these encoded words are transmitted to the Datanet 30,102. Interface units made up of teletypewriter coders and decoders are also capable of taking instructions from the Datanet 30, 102, decoding them, and translating the information into appropriate switch openings or closures in the corresponding control units.

In summary, whenever switch closures occur in the base station control unit, that information is encoded in an interface unit and transmitted to the Datanet 30. Whenever the central control program determines that further switching operations should equidistant performed at a particular base station, corresponding encoded words are transmitted back to an interface unit, which decodes the message and initiates control of the designated switch. In this manner, the computer 101 maintains control over the base stations.

The mobile units which may operate with the system shown in FIGS. 1A and 1B are standard MJ or MK mobile units including transmitter, receiver, and control apparatus, with the following changes in the control unit. Since the system of FIGS. 1A and 1B is designed to separate call-start channels and service channels, it is apparent that the normal channel hunt for an idle tone of standard MJ or MK mobile units is unsatisfactory. Accordingly, a logic circuit must be added to the control apparatus of the mobile unit to cause the operation thereof to correspond to the operation at the base stations. Rather than being free to hunt over the set of channels, the logic circuit added to the mobile unit control causes all units to fix themselves on the call-start channel. Only under the control of appropriate command signals from the base station is the mobile unit freed from the call-start channel and allowed to search for a channel marked with an idle tone. Moreover, when activated, the logic circuit frees the mobile unit to hunt for an idle tone as in standard systems. This permits only the called or calling party to be connected to the telephone central office by way of the particular channel selected by the computer 101, in accordance with the principles of the present invention.

Figure 2A:
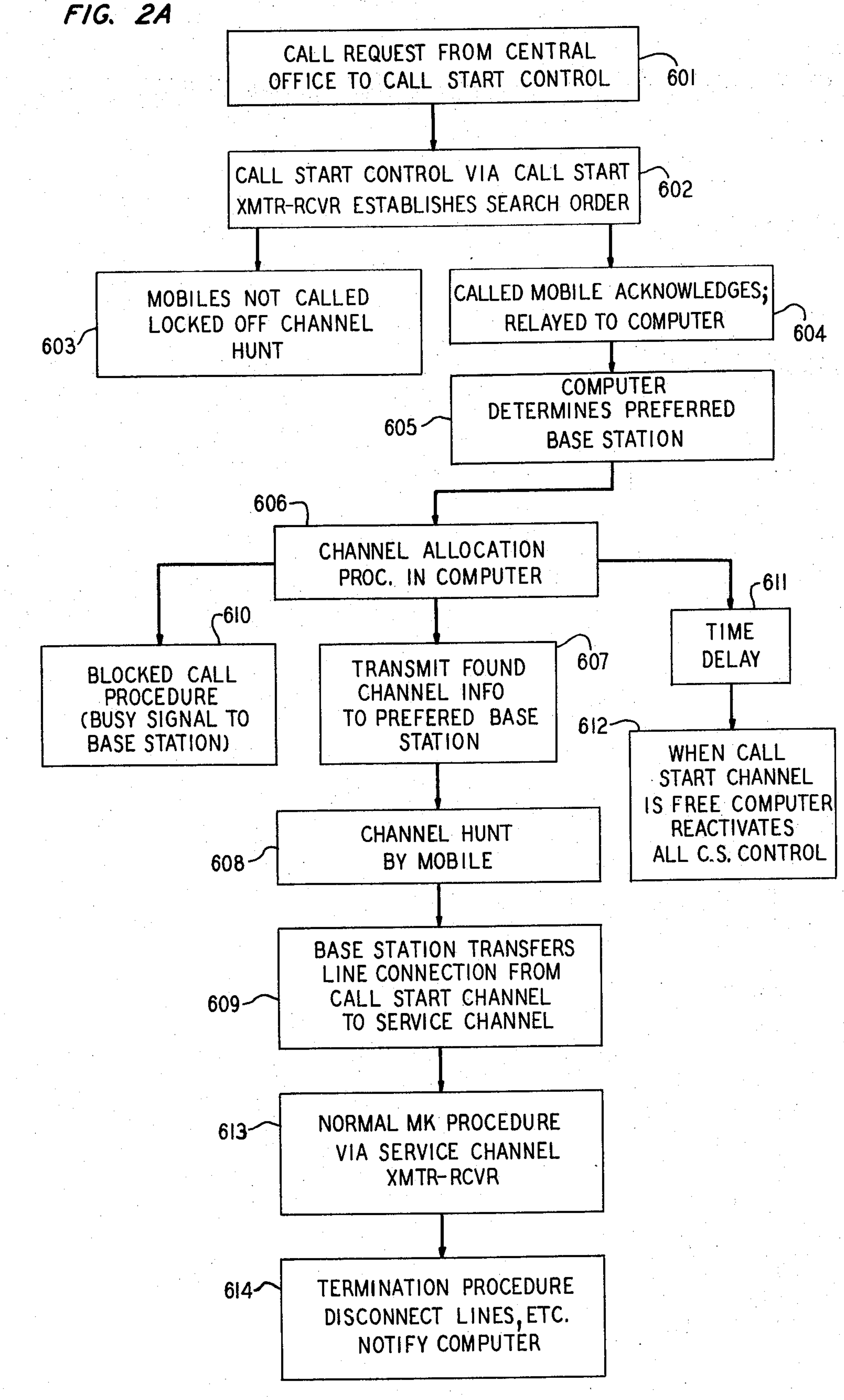
FIGS. 2A and 2B show call initiation procedures for the system shown in FIGS. 1A and 1B.
Figure 2B:
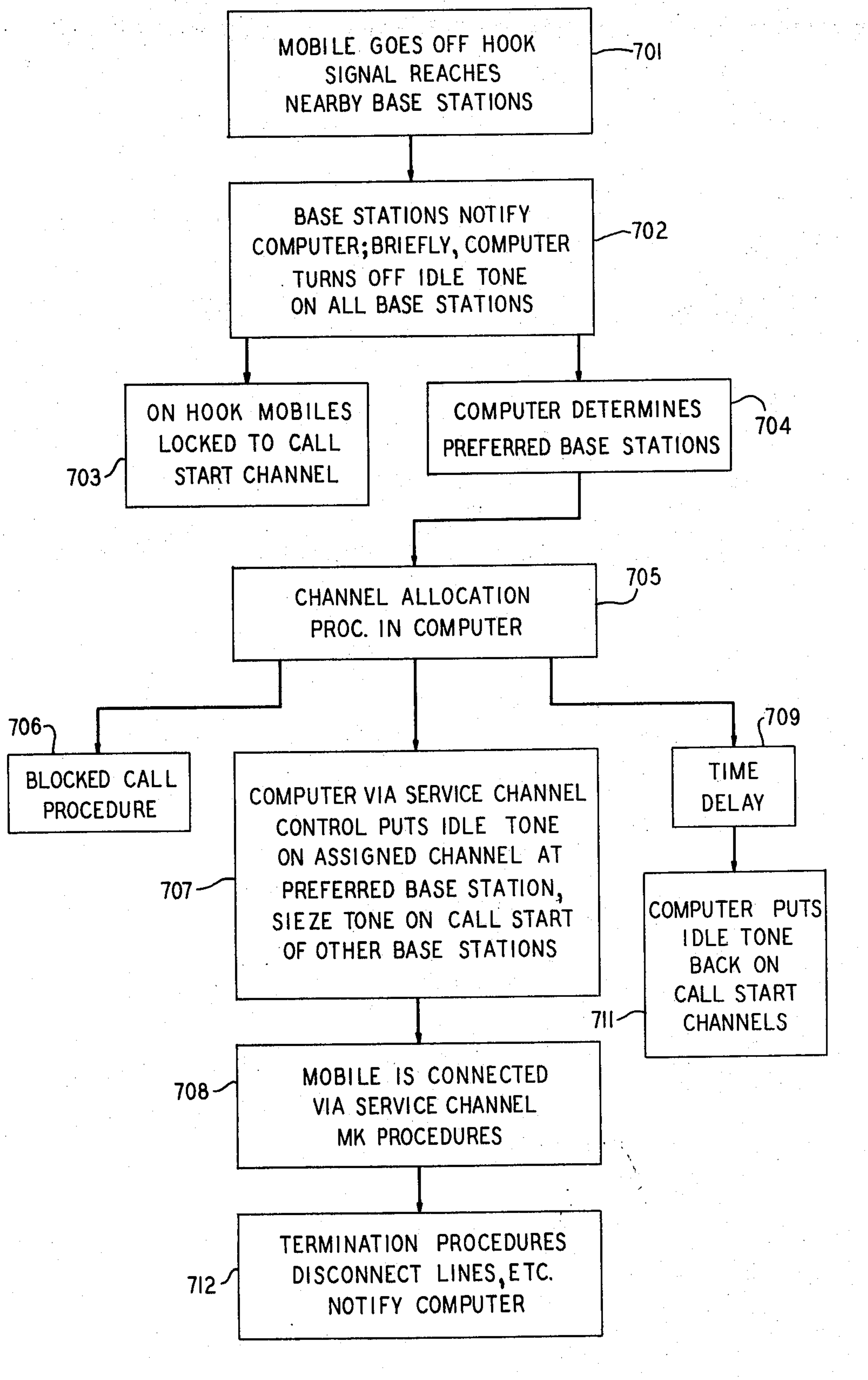

The operation of the embodiment of FIGS. 1A and 1B may be more clearly understood by detailing the procedure followed for establishing a communication channel. Accordingly, FIG. 2A shows a flow diagram of the calling procedure for a call to a mobile unit which originates at the central office, and FIG. 2B shows a flow diagram for the procedure followed for a call originated by the mobile unit. The procedures of FIGS. 2A and 2B are presented in block diagrammatic form for purposes of clarity. Thus, references to the figures shall be to the appropriate number of each block of the diagram.

In FIG. 2A, block 601 indicates that the call request comes from the telephone central office to all base stations. By means of the predetermined operation of the simple logic of each set of line switches, the caller's line is connected to the call-start control terminals at every base station via lines 106 of FIG. 1A. The line switches also prevent seizure of the service channel control stations. Thereupon, as in all standard MJ and MK radio systems, the call-start controls put a seize tone on the call-start channel at every base station. Since the logic package added to each mobile unit normally forces all units into the call-start channel, this alerts the mobile units throughout the system of FIG. 1A that a telephone call is pending.

Next, every call-start control terminal transmits a mobile identification code over the call-start channel to all mobiles in the area. This step is shown at block 602. The mobile identification code is a unique designation code number for each mobile unit and corresponds to a unique line pair from the central office. Accordingly, it is the intent of the step shown in block 602 to find the location of the party being called.

As designated by block 603, the mobile units which are not called, and which therefore have a mobile identification code which is different from that being transmitted over the call-start channel, receive a mismatch at their control circuitry and are consequently prevented from commencing any channel hunt until they next receive an idle tone over the call-start channel. On the other hand, the mobile unit corresponding to the mobile identification code being transmitted over the call-start channel receives a match in its internal logic, indicating that it is the called party. Consequently, as designated in block 604, the called mobile transmits an acknowledge tone (the guard tone of standard MJ and MK systems) back to the base station, thereby indicating that it is prepared to accept the connection. Thus, any base stations within the transmission range of the mobile unit will receive the guard tone, indicating its eligibility as a potential preferred base station for the eventual communication. The reception of the acknowledgement by a base station call-start receiver is sensed through its call-start control unit by an interface unit (such as unit 107), and is transmitted to the central processing unit.

Thus, at this point of the procedure, any base station within the range of the mobile user has received an acknowledge tone and this fact is transmitted to the computer 101 via the Datanet 30, 102. By a variety of available procedures, as represented by block 605, the computer 101 determines the preferred base station, i.e., the base station which appears to be the most desirable from the standpoint of transmission characteristics to maintain the connection with the mobile user. For example, the base station centrally located among those receiving an acknowledge tone may be designated the preferred base station. Thereupon, as represented at block 606, the computer 101 commences the channel allocation procedures which embody the principles of the present invention and which shall be described in detail in conjunction with FIGS. 3, 4, and 5.

Once the computer 101 performs the channel allocation procedure, the following alternatives are available. If no suitable transmission channel is found, the blocked call procedure represented at block 610 is followed. In the blocked call procedure, a busy signal or some similar indication is transmitted back to the base station and to the mobile user, after which the call-start channel connection with the mobile user is taken down. If, however, the channel allocation procedure results in the determination of an available channel, the identification of this channel is transmitted via the Datanet 30 and an interface unit to the preferred base station. This step is designated at block 607. Moreover, the channel status data set which is maintained in storage in the computer 101 is updated to show that the channel is to be assigned. Upon receiving the channel designation from the central control, the preferred base station via the service channel control terminal and transmitter places an idle tone on the channel designated by the computer 101 as the channel to be assigned. Also, by means of the call-start channel, the logic attached to the mobile unit control is energized, thereby releasing the called mobile unit to search for the channel upon which an idle tone is transmitted. The hunt by the mobile unit for the channel marked idle is shown at block 608. After a short delay to allow the mobile unit time to find the channel marked idle, the call-start control transfers the connection with the mobile user to the appropriate servicing channel by means of the line switches. This procedure is shown at block 609.

Approximately simultaneous to the channel establishment procedure but after a time delay 611 which allows the call-start channel to be freed, the computer 101 reactivates the call-start control at each base station in the system by way of the Datanet 30, 102. This step is shown at block 612.

In summary, the procedure of FIG. 2A to this point has provided a service channel to the mobile user which connects him with the telephone central office via a set of line switches and the lines 106. Moreover, once this connection is completed, the system is switched back to its call-start mode to await further calls. In addition, the data set representing channel usage at all base stations has been appropriately updated such that the computer 101 has maintained an accurate indication of the entire set of channel usage for the system.

Block 613 indicates that once a connection is established by means of a service channel, the base station to mobile unit communication proceeds as in standard MJ or MK systems. Finally, when the call is terminated, specified system termination procedures must be followed. These procedures which are represented at block 114 include disconnection of lines, return of the service channel to an available status and notification of the computer 101 by way of the service channel control and an associated interface unit so that it may change the data set which it maintains in storage.

FIG. 2B shows a flow diagram for the procedure followed in the case of a call initiated at the mobile unit. Prior to the detailed discussion of FIG. 2B, it should be noted that all mobile units not engaged in calls are tuned to the call-start channel. Only after a mobile unit has been released from the call-start channel by the base station may it begin to hunt for a service channel as in normal MJ or MK systems. If a mobile unit attempts to initiate a call but finds that the call-start channel is in use by another party, indicated by the fact that there is no idle tone on the call-start channel, the mobile unit must hang up and await a subsequent idle tone before it may initiate a call.

It is noteworthy that call setup procedures occur in a very short time, so the call-start channel will usually be free.

As shown at block 701, the mobile unit desiring to place a call first goes off-hook. Thereupon, as in standard MJ and MK systems, it transmits a guard tone on the channel to which it is tuned (the call-start channel). After 350 milliseconds, the mobile unit transmits a connect tone which is sensed by the base station call-start control terminal, also as in standard MJ or MK systems. Each base station which receives a connect tone from a mobile, indicating that it is a potential preferred base station for establishing the eventual communication link, transmits to the computer 101, by way of an associated interface unit and the Datanet 30, 102, an indication that it has received a connect tone from a mobile user. Thereupon, the computer 101, by way of the Datanet 30, 102, turns off the idle tone at the call-start terminals of all base stations. These procedures are outlined at block 702. Of course, as indicated by block 703, the termination of the idle tone on the call-start channel temporarily prevents any other mobile from initiating a call.

Next, the computer 101 determines which base station among those receiving the connect tone from the mobile user is preferable from the standpoint of transmission parameters to serve the mobile unit for a communication link. This step is shown at block 704. Once the preferred base station is determined by the computer 101, the channel allocation procedures which embody the principles of the present invention are performed by the computer 101 as represented in block 705.

The options occurring after performance of the channel allocation procedures are similar to those outlined in conjunction with FIG. 2A. That is, if no available channel is found, the blocked call procedure represented at block 706 is followed. If, on the other hand, the channel allocation procedure determines a channel which may be advantageously utilized, the computer 101 transmits the identification of the channel to the base station which had been deemed the preferred base station. In particular, the service channel controller of the preferred base station places an idle tone on the assigned channel, and the base station, by means of the call-start channel, releases the calling mobile unit from the call-start channel to perform its search for a channel marked idle. This procedure is shown at block 707. Once the mobile user is locked onto the channel marked idle, standard MK procedures are followed to set up a fully duplex communication link on the service channel indicated. This procedure is represented at block 708.

Upon determination of the channel which is to be assigned, but after a short time delay indicated at block 709, the computer 101 places the idle tone back onto the call-start channels. The time delay shown in block 709 is necessary to allow the calling mobile unit time to lock onto the channel marked idle. The reinstatement of the idle tone is shown at block 711.

Once the foregoing procedures have been followed, the channel to be used is properly established and the remaining procedure is identical to standard MJ or MK service procedures. Once the call is completed, the termination procedures indicated at block 712 must be followed, which include release of service channel, reinstatement of the mobile unit onto the call-start channel, and notification of the central processing computer 101 so that it may update its channel status data set which it maintains in storage.

Figure 3:
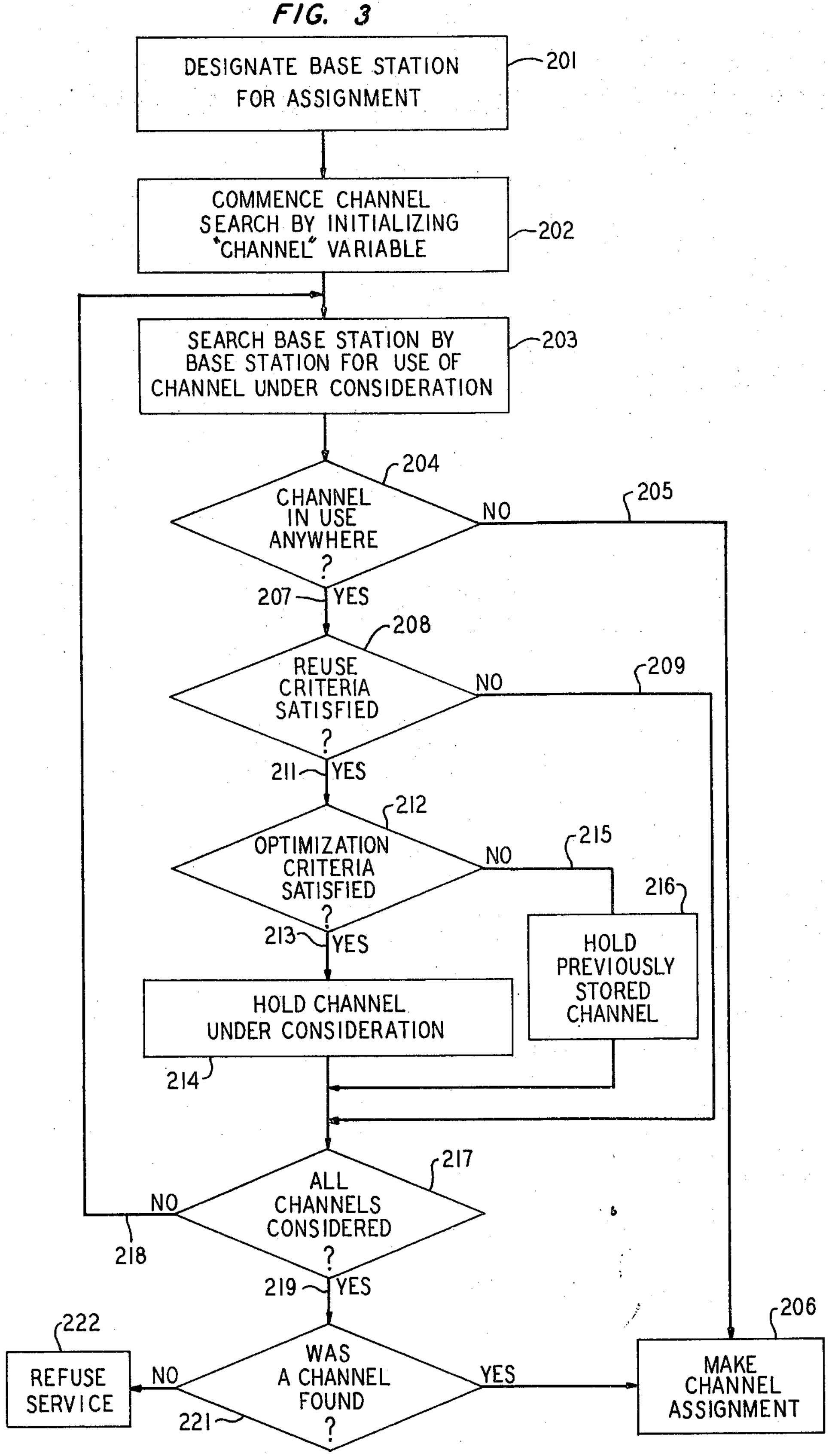
FIG. 3 shows a flow chart which embodies the principles of the present invention.
Figure 4A:
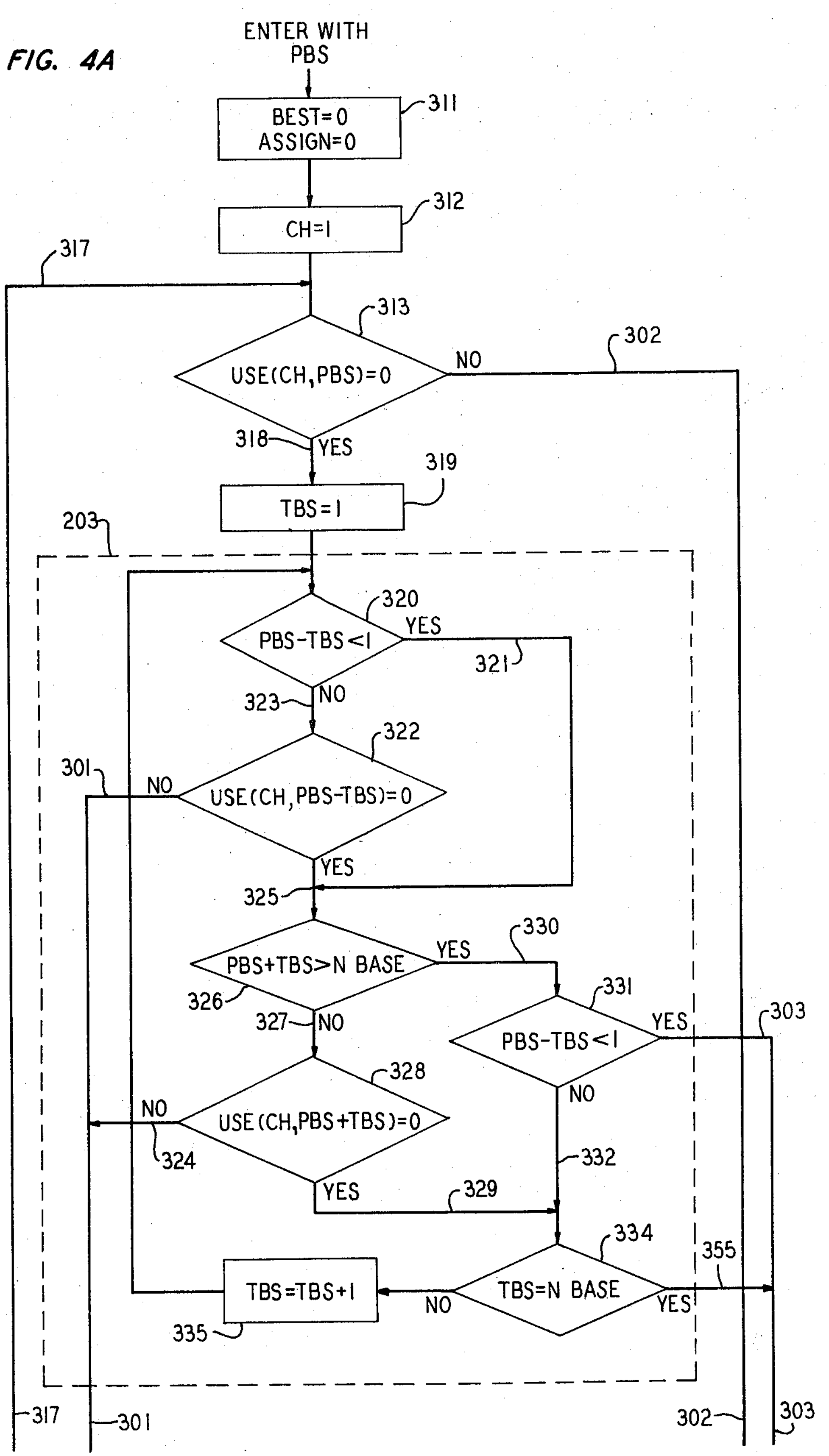
FIGS. 4A and 4B show a detailed flow chart which embodies the principles of the present invention for a one-dimensional case such as single highway or a railway.
Figure 4B:
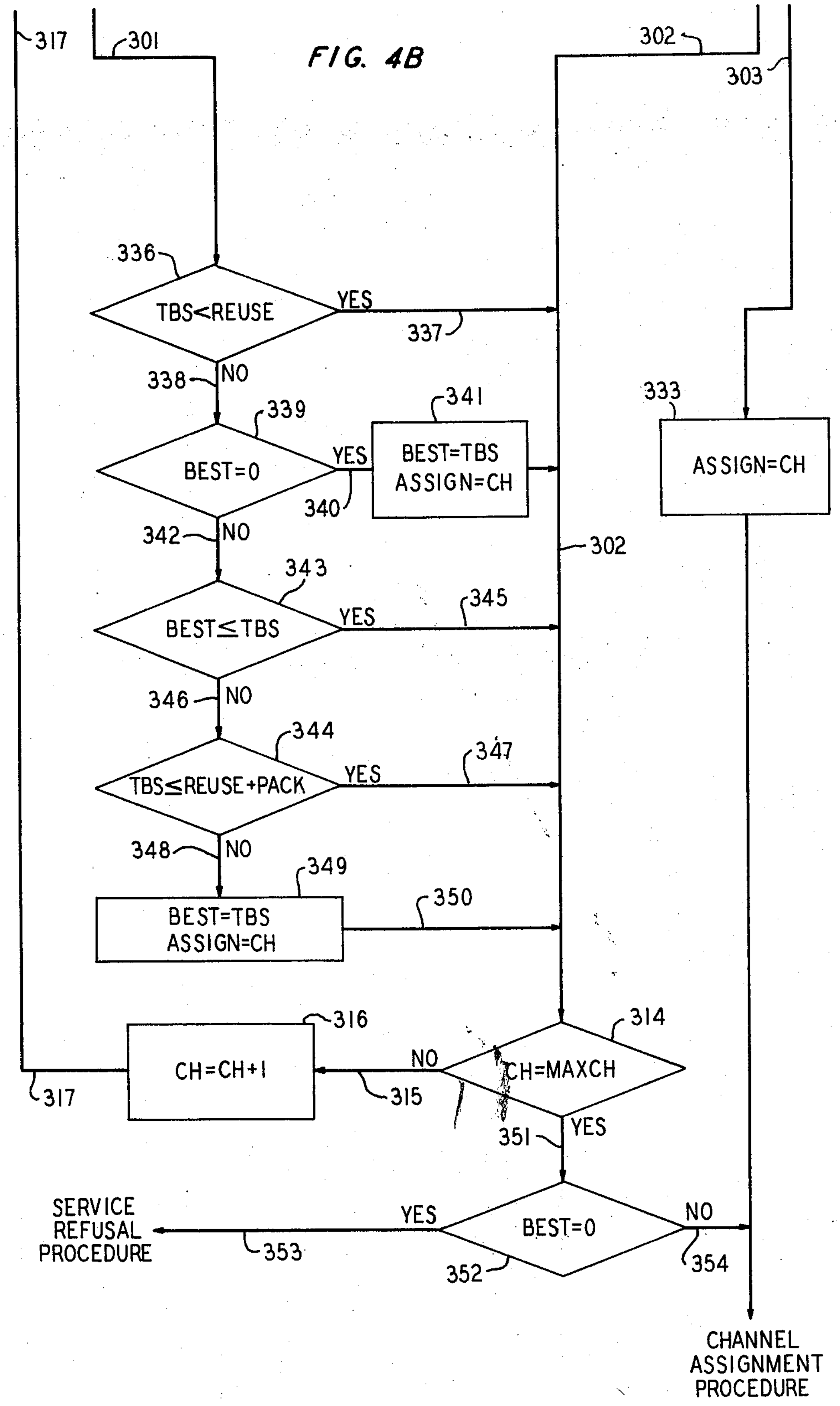

FIGS. 3, 4A, and 4B show flow charts which embody the principles of the present invention. Throughout the discussion of these figures the following conventions will be observed. Rectangular boxes represent definite steps or courses of action to be performed by the program (i.e., work box), and diamond-shaped boxes represent decisions which control the flow of the program (i.e., decision box). An equal symbol (=) within a box indicates that a substitution is being made. For example, $A = A + 1$ would mean that, at a particular memory location, the number currently being represented as the variable A should be replaced by the number represented by the variable $A + 1$. Perhaps, a useful approach to such steps would be to read them as "replace the number corresponding to variable A with the number corresponding to variable $A + 1$." If the equal symbol is found in a decision box, a question is implied. For example, $A = B$ in a diamond-shaped box implies the question, "Is A equal to B?" Further information on flow charting techniques may be found in "Fortran IV for Multi-Programming Systems" by Rudolph Schonbeck, Addision Wellesley 1968, Chapter 15.

The flow chart shown in FIG. 3 embodies the principles of the present invention for a generalized system. Accordingly, it will be assumed that the various base stations throughout the entire system are appropriately labelled and indexed to render them amenable to the system status data set which is stored in the central control unit. It is envisioned that a matrix-type storage like the one shown in FIG. 5 be used for the data set, with the elements of the matrix corresponding to base station-channel pairs, each element indicating whether or not the channel is used at that particular given base station. Other methods, however, may occur to those skilled in the art without departing from the principles of the present invention.

The flow chart of FIG. 3 begins at the step of designating a base station for assignment, this step being represented by work box 201. This base station designated for assignment is the so-called preferred base station described in the summary of the invention. As previously mentioned, this base station is assumed to be the one serving the geographic area in which the user is travelling, but other schemes for determining preference are possible. Once the preferred base station is chosen, the program commences a search of the entire set of channels used by the system, shown in work box 202. That is, the entire following procedure is completed for each channel before the next channel is considered.

When the first channel for consideration has been chosen, the program commences the base station-to-base station search represented at work box 203, search for use of the channel under consideration. Preferably, the base station which has tentatively been designated for assignment is the first one to be considered for use of the first channel. Subsequently, the base stations adjacent to the preferred base station are searched for use of the channel under consideration, after which the other base stations are searched in order of increasing distance from the preferred base station. If no base station is found at which the channel under consideration is being used, the test represented by decision box 204, testing whether the channel is in use anywhere, results in the NO Branch 205 being followed, and the channel assignment command represented in box 206 is made. Thereupon, the mobile user is connected by way of the preferred base station on that particular channel. If ever a base station is located in the search of base stations represented by work box 203, the search of the base stations is immediately discontinued and that base station is identified for subsequent testing. Of course, if a base station using the channel under consideration is found, the program flow proceeds from decision box 204, testing whether a channel is in use anywhere, along the YES Branch 207.

Next, the algorithm tests whether that particular base station satisfies the re-use criteria utilized by the system. This test is represented by decision box 208. If it does not satisfy the re-use criteria, the NO Branch 209 is followed, effectively removing that channel from further consideration, and resuming with the test represented by decision box 217. Otherwise, the YES Branch 211 is followed, allowing other tests to be performed.

At this point, more detail concerning the re-use criteria, may be informative. In its simplest form, the re-use test determines whether the base station, found in the search conducted by work box 203 to be using the channel under consideration, is located within some critical distance from the preferred base station. In particular, this critical distance corresponds to a range within which the signals from the two base stations are expected to overlap and therefore to interfere with one another. Thus, if the base station using the channel under consideration is closer than a re-use interval to the preferred base station, assigning that channel by way of the preferred base station will result in a substantial amount of base station-to-mobile and mobile-to-base station co-channel interference in the regions in which their broadcasting capabilities overlap. Other re-use criteria may be devised by taking into consideration the ruggedness of the terrain and other such geographic factors which would tend to limit the transmission range of a base station. Hereinafter, this simple minimum non-interfering distance criteria will be assumed as the one which is utilized.

If the re-use criteria are satisfied by the base station which is found by the search represented by decision box 203 to be utilizing the channel under consideration, the program determines whether it satisfies certain optimization criteria by performing the test shown in decision box 212. These criteria feature a comparison of the attributes of the base station-channel pair being considered with those of the pair previously found to be superior. If the channel under consideration is the first one to be considered, the optimization criteria are obviously satisfied, and the program proceeds along YES Branch 213 and at work box 214 the program holds the base station channel pair under consideration as the best one yet considered. If the channel under consideration is not the first one found to be utilized by a station outside the re-use interval, the program at decision box 212 compares the parameters of the base station using the channel under consideration with the parameters of the one previously stored as the best so far, in accordance with predetermined optimization criteria. If the parameters of the base station using the channel under consideration are found to be inferior from the standpoint of the optimization criteria to those of the one previously stored, NO Branch 215 is followed, and at work box 216 the program holds the previously stored channel as the best so far. Otherwise, YES Branch 213 is followed, and the channel under consideration is held as the best so far by the program at work box 214. In summary, the previously-stored base station channel pair is compared with the pair currently under consideration in accordance with prescribed optimization criteria. If the previously-stored channel better satisfies the criteria, it remains in storage; otherwise, the channel presently under consideration replaces the previously stored channel in storage.

Like the re-use criteria, several optimization criteria may be defined, depending upon the anticipated nature and configuration of the overall system. One set of optimization criteria which has proven to be very effective for superior packing of channels over the entire system attempts to assign channels as closely as possible to the minimum feasible distance, as defined by the re-use criteria. In other words, this method tests each base station under consideration with the previously stored one to determine which one is closer to a re-use interval from the preferred base station, the rationale being that the optimum packing over the entire system will be attained whenever the spacing between base stations using the same channel is reduced as closely as possible to the re-use interval. Another promising set optimization criteria utilizes the well known statistical method of mean square averaging. This method tries to optimize packing by simultaneously considering the set of channels in the system which are utilizing the channel under consideration, seeking to minimize the arithmetic mean of the square of the distances between the base stations already using the channel and the preferred base station. Of course, using the means square minimization approach would require that slight alterations be made in the search performed at work box 203, but these changes are of such a nature that they would be obvious to one skilled in the programming art.

Next, at decision box 217 the program determines whether all channels have been considered; if they have not, the NO Branch 218 is followed, which returns the program to work box 203 to continue the search of the set of channels one at a time. If they have, YES Branch 219 is followed. In this manner, the procedures occuring between work box 203 and decision box 217 are repeated once for each channel used by the system. When all channels have been considered, and YES Branch 219 is followed, at decision box 221 the program tests whether any channel was found and held which satisfies the above-mentioned tests. If none was found, the program at work box 222 signals that the mobile user should be refused service; otherwise, the channel which was found is assigned to the mobile user as indicated at work box 206.

The foregoing discussion of the flow chart shown in FIG. 3 has been phrased in general terminology to facilitate explanation of the general principles of the present invention without becoming involved with a profusion of potentially confusing variable names. Moreover, detailed descriptions of the particular types of searching and testing suggested by the embodiment of FIG. 3 were omitted, so that the basic, overriding procedure and order of the algorithm and method which comprise the present invention might be more clearly understood. The flow chart shown in FIGS. 4A and 4B depicts an embodiment of the present invention for a one-dimensional case in significantly more detail than the one shown in FIG. 3. From the embodiment of FIGS. 4A and 4B, it appears that it would be obvious to one having ordinary skill in the programming art to write and run an operating program in a well known computer language such as Fortran IV (see Appendix).

FIGS. 4A and 4B are to be considered as a single flow chart, making connection at lines 301, 302, 303, and 317. Thus, the flow begins at the top of FIG. 4A, proceeds to FIG. 4B at lines 301, 302, and 303, and concludes at the bottom of FIG. 4B. The following are the variable names utilized in FIGS. 4A and 4B:

ASSIGN — The output variable which corresponds to the channel number to be assigned to the mobile user.

BEST — The distance between the preferred base station and the base station currently being stored as the one which is the closest so far to the optimization criteria.

CH — The number of the channel being considered.

PBS — The number of the preferred base station.

TBS — The distance between pBS and the base station being considered for use of channel CH.

MAXCH — The total number of channels within the system.

NBASE — The total number of base stations within the system.

REUSE — The re-use interval.

PACK — A variable by which packing may be adjusted. For example PACK=0 corresponds to tight packing with increased forced call terminations, while PACK=1 causes lesser packing with fewer terminations.

USE(X,Y) — A function which determines whether the channel X is unused at base station Y. In its simplest form, this USE function searches the central control memory at the indicated X,Y coordinates.

It should be noted that the embodiment shown in FIGS. 4A and 4B utilizes the aforementioned minimum noninterfering distance as a re-use criterion and seeks to approximate as closely as possible re-use interval spacings for an optimization criterion.

The program is entered at the top of FIG. 4A with the preferred base station number PBS having been defined. At work box 311, the variables ASSIGN and BEST, corresponding respectively to the number of the channel found to be the most desirable thus far discovered and the distance between PBS and base station nearest to PBS, which is using that channel, are set to zero. Thus, setting BEST and ASSIGN to zero will enable the program to check subsequently to see whether a channel has been found which satisfies the various tests which are performed. Next, at work box 312, the variable representing the channel under consideration, CH, is set equal to one. This indicates that the first channel in the system set will be the first considered by the program.

The first test to be performed is represented by decision box 313, USE (CH,PBS) = 0. This test determines whether the channel under consideration, channel 1, is unused at base station PBS, the preferred base station. As was previously mentioned, the test may be embodied simply as a search of the channel-base station matrix stored in memory at the point corresponding to the pair (1,PBS). If the channel is not unused (i.e., it is in use) at the preferred base station PBS, NO Branch 302 is followed, and decision box 314 is the next one in the program flow. At decision box 314, the test CH = MAXCH is performed to determine whether the channel just considered is the maximum channel number. If not, NO Branch 315 is followed, the program at work box 316 increments the channel number by 1, and branch 317 is followed, returning the program to decision box 313.

If the channel use test at decision box 313 indicates that the channel under consideration, e.g., channel 1, is not in use at preferred base station PBS, YES Branch 318 is followed. Next, at work box 319, the program sets the variable TBS equal to 1. This variable, TBS, corresponds to the distance between PBS and the base stations being considered when comparing the various base stations in the system with the preferred base station PBS for channel use.

After work box 319, the program enters a base station search procedure which corresponds to the base station search routine shown at work box 203 of FIG. 3. For convenience, this procedure in FIG. 4A is surrounded by a dotted line and marked 203. Briefly, the approach taken to searching the set of base stations for use of the channel under consideration (i.e., channel CH) is to begin at the preferred base station and to consider pairs of base stations equidistant from the preferred base station. That is, each time variable TBS is incremented, the program searches another pair of base stations, each succeeding pair being further away from the preferred base station PBS than was the previous pair.

More particularly, the channel search routine proceeds as follows. First, at decision box 320, the program tests whether the difference between the preferred base station PBS and the number of base stations considered, TBS, is less than 1. This tests whether the base station numbered PBS − TBS is out of range of the system. For example, if the preferred base station is spacially located at the extreme end of the system, and no other base stations exist to one side of it (defined as its negative side), it will be meaningless to perform use tests for coordinate pairs on that side. Thus, the test represented at decision box 320 is designed to tell whether it is desirable for a channel activity check to be made at the base station numbered PBS − TBS. If the PBS − TBS test at box 320 indicates that a test is to be performed, NO Branch 323 is followed. Otherwise, YES Branch 321 is followed, thereby bypassing decision box 322. At box 322, the program repeats the previously described USE function, but at this time testing for the use of channel CH at the base station numbered PBS − TBS. If it is not unused, NO Branch 301 is followed; otherwise, YES Branch 325 is followed. Assuming that the YES Branch 325 was followed, indicating that channel CH was not in use at base station PBS − TBS, the program proceeds to decision box 326. The test represented at decision box 326, PBS + TBS > NBASE, is similar to the one conducted at decision box 320, but instead, refers to the other side of the preferred base station. Thus, at decision box 326 the program tests whether the base station to be considered on the positive side (i.e., base station PBS + TBS) is within the range of the system. If base station PBS + TBS is shown to be within the system range, NO Branch 327 is followed, and at decision box 328 the program performs a test whether channel CH is in use at base station PBS + TBS. If the channel is in use, NO Branch 324 is followed onto line 301; otherwise, YES Branch 329 is followed. If the range test performed by the program at decision box 326 indicates that the base station PBS + TBS is out of range, YES Branch 330 is followed. Thus, if the program has proceeded to YES Branch 330, this indicates that the base station under consideration is not in range on the positive side of preferred base station PBS, and it is either not in use at base station PBS − TBS or base station PBS − TBS is not in range either. Thus, at decision box 331 the program repeats the negative side "out of range" test performed at decision box 320. Then, if the PBS − TBS < 1 test at box 331 indicates that the base station numbered PBS − TBS is out of range, YES Branch 303 is followed; otherwise, NO Branch 332 is followed. If the program proceeds along Branch 303, indicating that the base stations numbered PBS ± TBS are both out of range, the channel under consideration, CH, is assigned at work box 333 by storing as the variable ASSIGN the number CH. On the other hand, the following of NO Branch 332 indicates that channel CH is not in use at base station PBS − TBS. Consequently, when the program reaches decision box 334, this indicates that the channel CH is not in use at PBS ± TBS, nor at any base station closer than PBS ± TBS.

At decision box 334, the program tests whether the distance under consideration TBS is equal to NBASE, i.e., whether distance from PBS to the station last considered is the maximum possible distance in the system. If it is, indicating that all base stations have been checked and none are using channel CH, YES Branch 355 is followed onto line 303 and channel CH is assigned at work box 333. If distance TBS was not the last to be considered by the program, at work box 335, TBS is incremented by one and the program proceeds back to decision box 320 to repeat the search procedure for the next TBS value.

In summary, the base station search procedure, delineated by dotted box 203, considers two base stations at a time radiating outward from the preferred base station. In particular, the program may exit from the search procedure at three places, lines 301, 302, and 303. As was previously mentioned, proceeding along line 303 causes channel CH to be assigned at work box 333 and proceeding along line 302 causes that channel to be eliminated from further consideration. If the program proceeds along line 301, this indicates that the channel may indeed be available for assignment, depending upon the relative location of the base station at which it was found to be used at decision boxes 322 or 328.

At this point, the flow of the program proceeds to the portion of the flow chart shown in FIG. 4B. Proceeding along line 301, the program first performs the test indicated at decision box 336, TBS < REUSE. This test determines whether the distance between the preferred base station and the base station under consideration (i.e., PBS ± TBS) is less than the minimum REUSE interval. If TBS is less than REUSE, indicating that if channel CH is assigned to PBS, stations PBS and PBS ± TBS will encounter unwanted interference problems, YES Branch 337 is followed to line 302 and the channel CH is eliminated from further consideration. If TBS is greater than REUSE, however, NO Branch 338 is followed and the program proceeds to decision box 339.

The test BEST=0 at decision box 339 determines whether channel CH currently being considered is the first channel found to be reused at a base station greater than the REUSE interval away from the preferred base station PBS. If so, YES Branch 340 is followed, and at work box 341 the program assigns the value of TBS to the variable BEST and value of CH to the variable ASSIGN, indicating that channel CH is the best available channel thus far discovered by the program. Then, via line 302, the search is continued for other channels. If the variable BEST is some value other than zero, indicating that another channel had previously been found which satisfies the REUSE criteria, No Branch 342 is followed to enable comparison with optimization criteria.

In the flow chart of FIGS. 4A and 4B, the optimization criteria and testing are particularly embodied at decision boxes 343 and 344. As was previously mentioned, the optimization technique utilized is one which seeks to re-use channels at base stations separated by a distance matched as closely as possible to the minimum re-use interval. Accordingly, at decision box 343, the program performs a test to determine whether BEST is less than or equal to TBS. Since the program flow at NO Branch 342 guarantees that channel CH satisfies the REUSE criteria test of decision box 336, the test at decision box 343 in fact determines whether the separation TBS between the preferred base station PBS and the base station using the channel under consideration CH is less than or greater than the corresponding distance BEST of the previous most desirable channel. Thus, if TBS is greater than or equal to BEST, indicating that the channel presently being considered is no better than the previous most desirable channel, YES Branch 345 is followed onto line 302 and the program proceeds to consider subsequent channels. On the other hand, if TBS is less than BEST, NO Branch 346 is followed, and the test represented at decision box 344 is performed.

At box 344 the program tests whether the spacing TBS is less than the re-use interval, REUSE, plus packing variable, PACK. This test allows the programmer to control to a certain degree the tightness of packing by varying the packing variable PACK. For example, if a very high degree of packing is desired, and the concomitant increase of forced-call terminations is not deemed a serious detriment, PACK may be set equal to 0. If PACK is set to some positive integer, however, the system packing will be somewhat looser, with corresponding decrease in the number of forced-call terminations. Thus, if TBS is less than REUSE + PACK, indicating an undesirable spacing, YES Branch 347 is followed onto line 302, and subsequent channels are considered. If TBS is greater than REUSE + PACK, the base station PBS ± TBS, which is using the channel under consideration CH is clearly the most desirable channel considered thus far, and NO Branch 348 is followed to work box 349. At work box 349 the program assigns the current values of TBS and CH, respectively, to the variables BEST and ASSIGN. Then, via branch 350 the program returns to line 302.

Each time the program flow reaches decision box 314, it tests whether the channel CH just considered is equal to the total number of channels in the system. If not, NO Branch 315 is followed and subsequent channels are considered. If CH equals MAXCH, all channels have been considered, and YES Branch 351 is followed to decision box 352. It may be recalled that at the very outset of the program, as represented at work box 311, the variable BEST was set equal to 0. Consequently, when the program at decision box 352 tests whether BEST is still equal to 0, it is effectively determining whether the entire foregoing search procedure has found a channel which satisfies all of the various re-use and optimization tests. If BEST is still equal to zero, as initialized, no useful channel was found and YES Branch 353 is followed, indicating that the system should proceed along established service refusal procedures. On the other hand, if BEST is not equal to zero NO Branch 354 is followed and established channel assignment procedures are followed by the system.

In summary, after performing all of the foregoing search and test procedures, the program flow may exit at two points. If no assignable channel was found, it exits to a service refusal procedure. If, however, the program had at any time made assignments at work boxes 333, 341, or 349, at least one channel is available for assignment and that assignment is made in accordance with the system channel assignment procedures.

Figure 5:
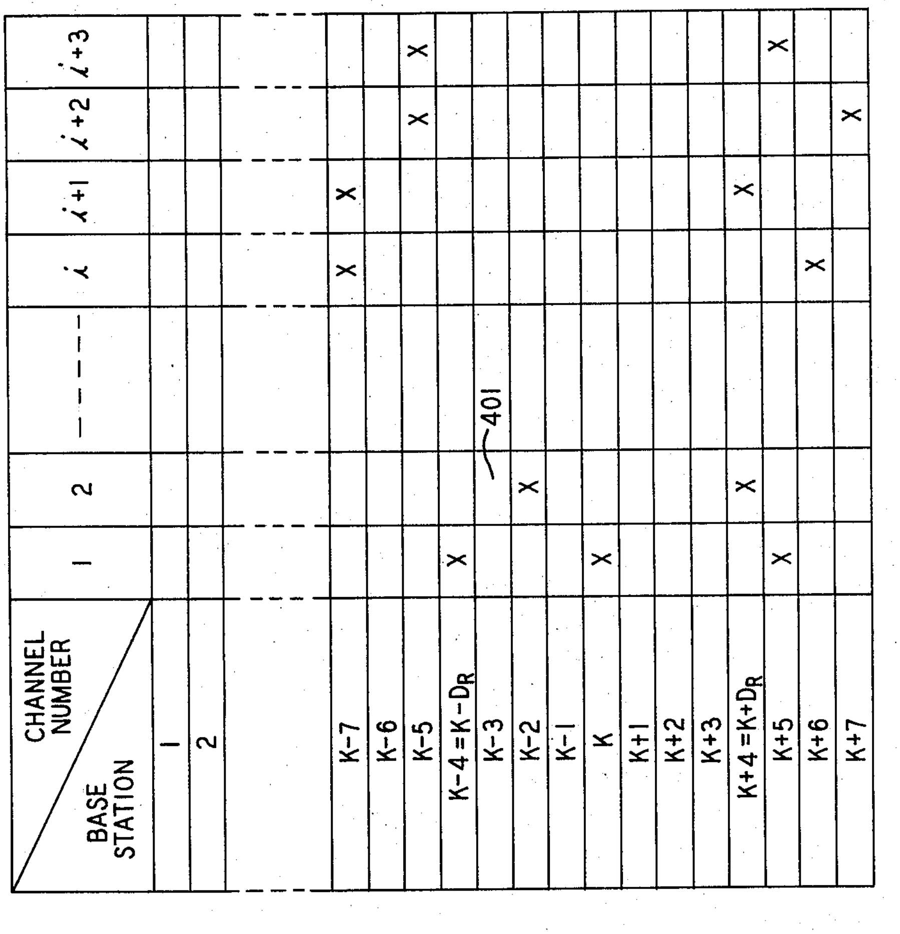
FIG. 5 shows a table which exemplifies the operation of the present invention in accordance with the system of FIGS. 1A and 1B.

The foregoing embodiments of the present invention may be even more clearly understood if they are considered in conjunction with the following example. FIG. 5 shows a two-dimensional matrix which is one suggested format for arranging the central control memory to facilitate the channel search procedure described in conjunction with the search represented at decision box 203. In FIG. 5 channel numbers 1 through $i+3$ are labelled across the top, while base stations 1 through $k+7$ are shown on the left hand column. Consequently, the boxes at the intersection of lines and columns may be conveniently defined to represent the use state of the corresponding channel at the corresponding base station. Thus, if the program were required to perform the test USE $(2, k-3)=0$, it would search to see whether box 401 was marked or unmarked, indicating respectively whether channel 2 was in use or unused at base station $k-3$. For the following example, the REUSE interval, designated as $D_R$, shall be assumed to be equivalent to the distance covered by three base stations. Thus, if a channel is in use at some base station $y$, that channel may not be re-used at base stations $y \pm 1$, $y \pm 2$, or $y \pm 3$.

In the example of FIG. 5 referral shall be made to corresponding work and decision boxes in FIGS. 4A and 4B. The example begins with the assumption that the preferred base station from which the user signals his demand for channel allocation is base station K. Accordingly, the program commences with the assumption that PBS = K. After the variable initialization has taken place at boxes 311 and 312, consideration of channel 1 begins. At decision box 313, the program checks for use of channel 1 at base station K. Since the chart of FIG. 5 indicates that channel 1 is being used at base station K, NO Branch 302 is followed onto decision box 314. There, since channel 1 is not equal to the total number of channels utilized by the system $(i+3)$, NO Branch 315 is followed to work box 316 where variable CH is incremented from 1 to 2, and the program flow returns to decision box 313.

Since channel 2 is not in use at base station K, YES Branch 318 is followed from decision box 313, and the channel search represented at work box 203 commences. Since K − 1 is not less than 1, NO Branch 323 is followed from decision box 320 and the program checks at decision box 322 for use of channel 2 at base station K − 1. Since channel 2 is not in use there, YES Branch 325 is followed and the program similarly considers base station K + 1. The use test represented at decision box 328 indicates that channel 2 is unused at station K + 1, also, and YES Branch 329 is followed. Since only one value of TBS has been thus far considered, the program proceeds to work box 335 and the variable TBS is incremented from 1 to 2. Again, the base station search procedures are repeated, whereupon the use test represented at decision box 322 indicates that channel 2 is in use at base station K − 2. Accordingly, NO Branch 301 is followed, and the program next conducts the re-use test represented at decision box 336. Since the variable TBS is at this point equal to 2 and the re-use interval is equal to 4 (i.e., not in use for three consecutive stations), YES Branch 337 is followed from box 336 onto line 302, and after repeating the test at decision box 314, the program proceeds back along NO Branch 315. In this manner, the program continues to increment through the channels.

Assuming that no suitable channel has been found before channel $i$ is considered, channel $i$ will be the first which is deemed appropriate for allocation. That is, the base station search procedure represented at box 203 will be exited via line 301 when the TBS is equal to 6, since channel $i$ is in use at base station K + 6. Moreover, since the TBS value of 6 is greater than the REUSE value of 4, No Branch 338 is followed. Since channel $i$ is the first one which passed the foregoing tests, BEST is still 0 and YES Branch 340 is followed to work box 341. Thus, the program causes the value 6 to be stored at the location of the variable BEST and the value $i$ to be stored in the location of the variable ASSIGN. Accordingly, if no further channels are deemed to be suitable for assignment, channel $i$ will be the one which is assigned to the demanding user.

When channel $i+1$ is considered by the program, it proceeds as it did for channel $i$, except that when the program flow reaches decision box 339, the variable BEST is 6 rather than 0. Accordingly, NO Branch 332 is then followed and optimization testing begins. Since the value of TBS, 4, is less than the value of BEST, 6, NO Branch 346 is followed from decision box 343. Assuming a value of PACK equal to o, NO Branch 348 is followed, whereupon BEST is set equal to 4, and ASSIGN is set equal to $i+1$. Of course, if the variable PACK is assumed to be 1 or more, TBS is greater than REUSE + PACK, YES Branch 347 is followed, and BEST and ASSIGN remain as previously set.

The program then proceeds to check channels $i+2$ and $i+3$. It is obvious from inspection of FIG. 5, however, that with the optimization criteria being utilized herein, channel $i+1$ remains the most desirable channel for assignment. Accordingly, after channel $i+3$ is considered, the test represented at decision box 314 indicates that all channels have been considered and YES Branch 351 is followed. Since BEST is 4, rather than 0, the program then proceeds from decision box 352 along NO Branch 354, and the channel assignment procedure merely involves assigning channel $i+1$ to the demanding mobile user.

At this point, it is useful to reconsider the example of FIG. 5 as it would have operated with other types of optimization criteria. For example, if the mean square minimization strategy is followed, channel $i+3$ would have been designated as the channel for assignment.

The mean square assignment strategy is defined by the well known relation $$\frac{1}{n}\sum_{j=1}^{n} D_j^2$$

in the interval (1)

$$D_R \leq D_J < 2D_R$$

where $D_j$ is the distance between the preferred base station and the base stations using channel CH within the specified interval, and $n$ is the number of base stations using the channel within the specified interval. If the optimization criteria had been the same as indicated (i.e., re-use interval spacing attempt) but with the variable PACK set to 1, the program would assign channel $i+2$, since channel $i+1$ would be rejected by the test represented at decision box 344. Finally, the program might have been set up to operate with no optimization criteria at all, assigning the first channel found to satisfy the re-use criteria. Of course, this would have resulted in the assignment of channel $i$.

The foregoing embodiments have been intended as illustrations of the principles of the present invention. Accordingly, other embodiments may occur to those skilled in the art without departing from the spirit and scope of the principles of the present invention.

APPENDIX

Following is a Fortran IV listing of the procedure defined in FIGS. 4A and 4B. Accordingly, the variable names in the listing are identical to those in FIGS. 4A and 4B. Thus, to render them in the fixed point notation, a separate INTEGER instruction so declaring them is added. Also, the step numbered 100 is a "dummy" step, merely for inclusion in various IF statements. The program begins at a point corresponding to work box 311 in FIG. 4A, that is, with the variable PBS already determined.

```
      INTEGER BEST,ASSIGN,CH,PBS,TBS,USE,-
         PACK,REUSE
      BEST=0
      ASSIGN=0
      CH=1
415   IF(USE(CH,PBS))100,400,471
400   TBS=1
C     TBS IS INCREMENT AWAY FROM PBS
410   IF(PBS'BS−1)411,412,412
412   IBSJ=PBS−TBS
      IF(USE(CH,IBSJ))411,411,420
411   IF(PBS+TBS−NBASE)414,414,440
414   IBSPJ=PBS+TBS
      IF(USE(CH,IBSPJ))425,425,420
440   IF(PBS−TBS−1)444,425,425
425   IF(TBS−NBASE)445,444, 444
445   TBS=TBS+1
      GO TO 410
C     PACK=0 FOR MIN REUSE INTERVAL
420   IF(TBS .LT. REUSE) GO TO 471
      IF(BEST .NE. 0) GO TO 473
      BEST=TBS
      ASSIGN=CH
      GO TO 471
473   IF(BEST .LE. TBS) GO TO 471
      PACK=0
      IF(TBS .LT. (REUSE+PACK)) GO TO 471
      BEST=TBS
      ASSIGN=CH
471   IF(CH−MAXCH)477,478,478
477   CH=CH+1
      GO TO 415
478   IF(BEST)100,460,450
444   ASSIGN=CH
```

Step 450 is therefore the first step in the channel assignment procedure, and step 460 is the first step in the service refusal procedure.

What is claimed is:

1. In a mobile communication system including a central control and a plurality of local base stations, an improved method for dynamically assigning one of a plurality of transmission channels wherein the improvement comprises:

searching said local base stations for status of use of all of said transmission channels;

identifying for each of said transmission channels a set of local base stations at which the channel is in use;

selecting the ones of said channels whose associated set from said identifying step includes only base stations which are located at least a predetermined distance from the preferred base station;

choosing from said ones of said channels in accordance with optimization criteria a preferred channel for assignment; and assigning the preferred channel.

2. The method described in claim 1 wherein said predetermined distance in said selecting step is the distance at which signals transmitted by two base stations will interfere with one another.

3. The method of claim 1 wherein the step of choosing from said ones of said channels a preferred channel for assignment comprises identifying a channel whose associated set from said identifying step includes a base station which is separated from said preferred base station by a distance closest to said predetermined distance.

4. The method of claim 1 wherein the step of choosing from said ones of said channels a preferred channel for assignment comprises identifying a channel whose associated set from said first identifying step includes a base station which is separated from said preferred base station by a distance closest to said predetermined distance plus an additional distance to facilitate packing control.

5. The method of claim 1 wherein the step of choosing from said ones of said channels a preferred channel for assignment comprises calculating once for each channel the sum of the squares of the distance between the preferred base station and each local base station using the channel, and picking the channel characterized by the minimum sum of the squares of said calculating step.

6. In a mobile radio-telephone system including a central control and a plurality of local base stations, a method for dynamically assigning one of a plurality of transmission channels to a mobile user via a preferred base station comprising the steps of:

selecting a preferred base station from which communication on the assigned channel will be transmitted and received;

choosing a first one of said plurality of transmission channels;

searching said plurality of base stations for usage thereby of said first channel;

comparing the spacial relationship of said preferred base station with a base station using said first channel in accordance with re-use criteria;

repeating said choosing, searching, and comparing steps for each of said plurality of channels; and selecting in accordance with optimization criteria a preferred channel from the set of channels used by the base stations satisfying the re-use criteria.

7. The method for assigning transmission channels described in claim 6 wherein said searching step includes the steps of iteratively searching sets of base stations, each set comprising a portion of said plurality of base stations located approximately equidistnat from said preferred base station, nearer base stations being searched prior to more distant base stations.

* * * * *